United States Patent [19]

Kuranaga

[11] Patent Number: 5,297,261
[45] Date of Patent: Mar. 22, 1994

[54] MULTIPROCESSOR SYSTEM WITH POWER-ON RESET FUNCTION

[75] Inventor: Kazuhiko Kuranaga, Machida, Japan

[73] Assignee: Fujitsu Limited, Kanagawa, Japan

[21] Appl. No.: 536,758

[22] Filed: Jun. 12, 1990

[30] Foreign Application Priority Data

Jun. 12, 1989 [JP] Japan .................................. 1-148682

[51] Int. Cl.⁵ .............................................. G06F 13/00
[52] U.S. Cl. ................................... 395/325; 364/230;
364/230.4; 364/273.5; 364/DIG. 1;
364/931.44; 364/948.91; 364/DIG. 2
[58] Field of Search .............. 395/725, 750, 325, 200;
364/230, 230.4, 273.5, DIG. 1, 931.44, 948.91,
DIG. 2; 371/12, 14, 66, 16.3

[56] References Cited

U.S. PATENT DOCUMENTS

| 4,204,249 | 5/1980 | Dye et al. .......................... 395/750 |
| 4,750,136 | 6/1988 | Arpin et al. ........................ 364/514 |
| 4,803,682 | 2/1989 | Hara et al. ......................... 371/12 |
| 4,860,289 | 8/1989 | Coulson ............................ 371/16.3 |
| 4,882,669 | 11/1989 | Miura et al. ...................... 364/184 |
| 4,914,576 | 4/1990 | Zelley et al. ..................... 395/575 |
| 4,979,105 | 12/1990 | Daly et al. ........................ 371/16.3 |
| 5,070,450 | 12/1991 | Holman, Jr. et al. ............ 395/750 |
| 5,155,729 | 10/1992 | Rysko et al. ..................... 371/16.3 |

Primary Examiner—Michael R. Fleming
Assistant Examiner—Glenn A. Auve
Attorney, Agent, or Firm—Staas & Halsey

[57] ABSTRACT

A multiprocessor system with power-on reset, comprising a plurality of printed circuit boards each provided with at least one processor, is provided. A power supply voltage monitor circuit is mounted on at least one of the printed circuit boards to provide a reset signal by detecting change of voltage when a power supply is energized. A first signal line serially connects the power supply voltage monitor circuit to all printed circuit boards, and a second signal line returning from the last printed circuit board may be provided, the processors having reset signal lines connected to the second signal line.

20 Claims, 4 Drawing Sheets

MULTIPROCESSOR SYSTEM WITH POWER-ON RESET FUNCTION

BACKGROUND OF THE INVENTION

1. Field of the Invention

The present invention relates to a multiprocessor system which is provided with a plurality of printed circuit boards for power-on reset of processors when the power is turned on.

Generally, in the case of driving a processor, the reset processing is executed for initializing programs so that each of the programs is executed correctly when the power is turned on.

Particularly, each processor must be reset simultaneously in the multiprocessor system which executes the one process with a plurality of processors by respectively providing the processors in an of processing function.

2. Description of the Prior Art

FIG. 1 to FIG. 3 show a structure of a multiprocessor system of the prior art. FIG. 1 is a structure providing a plurality of processors in a single printed circuit board. The printed circuit board 1 is provided with processors $2_1$, $2_2$.

Both processors $2_1$, $2_2$ are respectively provided with a power supply voltage monitor circuit 3 to supply the power-on reset signal. Upon detection of 5V power supply voltage, the power supply voltage monitor circuit 3 outputs a reset signal. The processors $2_1$, $2_2$ are reset with the power-on reset signal of the power supply voltage monitor circuit 3.

The structure shown in FIG. 1 has a plurality of processors on one printed circuit board. Namely, a plurality of processors operate with a common power supply. Therefore, the printed circuit board is provided with only one power supply voltage monitor circuit. This monitor circuit supplies the power-on reset signal to each processor when the power is turned ON.

This structure is effective for executing simple processing with the multiprocessor. However, the structure which carries out complicated processing requires many input/output circuits in the periphery of processors. Therefore, provision of many processors on one printed circuit board results in problems.

FIG. 2 and FIG. 3 show the structure providing the processors on a plurality of printed circuit boards.

In FIG. 2, $4_1$ and $4_2$ designate printed circuit boards and these are connected with a connector 5.

The processor 6 and power supply voltage monitor circuit 7 are provided on the printed circuit board $4_1$, while the processor $6_2$ is provided on the printed circuit board $4_2$.

Here, when the power supply is turned on for the printed circuit boards $4_1$ and $4_2$, the power supply voltage monitor circuit 7 detects a supply of power source voltage and outputs the reset signal. With the reset signal of the power supply voltage monitor circuit 7, the processor $6_1$ is power-on reset and the processor $6_2$ is also power-on reset through a connector 5.

As shown in FIG. 2, the structure where a plurality of processors are reset by the power supply voltage monitor circuit 7 provided on one printed circuit board has merit in that a plurality of processors are reset simultaneously. However, when power is turned on while a fault is generated in the connector connecting the printed circuit boards, only one printed circuit board is reset and the other processors are not reset.

As explained above, here rises a problem that the system as a whole operates without control because the other processors are not reset.

FIG. 3 indicates a structure that the printed circuit board $8_1$ is provided with the power supply voltage monitor circuit $10_1$ and the processor $9_1$. The printed circuit board $8_2$ is also provided with the power supply voltage monitor circuit $10_2$ and processor $9_2$.

In such a structure, when the power supplies of printed circuit boards $8_1$ and $8_2$ are turned on, the power supply voltage monitor circuit $10_1$ provided on the printed circuit board $8_1$ power-on resets the processor $9_1$ provided on the same printed circuit board $8_1$.

In the same way, the power supply voltage monitor circuit $10_2$ provided on the printed circuit board $8_2$ power-on resets the processor $9_2$ provided on the same printed circuit board $8_2$.

In FIG. 3, each of the power supply voltage monitor circuits outputs a reset signal at a different timing because a voltage level of each printed circuit board becomes stable at a different time. When the power is turned on, a deviation of power-on timing for all processors occurs. It is therefore no longer possible to simultaneously reset the processors $9_1$ and $9_2$.

Therefore, the system employing the multiprocessor structure noted above results in a problem that the processor process cannot be realized stably.

The structure of FIG. 1 also results in a problem that the structure of the printed circuit board becomes large because a plurality of processors for different functions are accommodated on the one printed circuit board.

On the other hand, the structure of FIG. 2 does not result in a problem that the structure of the printed circuit board becomes large, because only one processor is provided on the one printed circuit board.

However, this structure results in a problem that sometimes occurs that the reset signal from the power supply voltage monitor circuit is not reset if connection between the printed circuit boards is bad in the printed circuit board that is not providing the power supply voltage monitor circuit.

Unlike the case where reset is not carried out as shown in FIG. 2 because connection between the printed circuit boards is not related, the structure of FIG. 3 results in a problem that if power-on timing deviates, the processors $9_1$ and $9_2$ are no longer reset simultaneously.

SUMMARY OF THE INVENTION

It is therefore an object of the present invention that the processor of each printed circuit board be reset simultaneously in the multiprocessor system. Another object of the present invention is to prevent abnormal state of the multiprocessor system when connection between the printed circuit boards is defective.

The characteristics of the present invention are that processors are respectively provided on a plurality of printed circuit boards; a power supply voltage monitor circuit which provides a reset output signal by detecting change of voltage for power-on is provided on at least one of the printed circuit boards; the ascending signal line for cascade connecting the output of power supply voltage monitor circuit to the other printed circuit boards and the descending signal line returning from the final printed circuit board of cascade connected boards are provided and the reset signal lines of a plurality of processors are connected to the descending signal line.

The characteristics of other present invention include that the multiprocessor system may be provided with a power-on reset circuit which resets the processors provided on a plurality of printed circuit boards by detecting change of voltage for system power-on in the power supply voltage detecting circuit.

First, the processors are connected with connectors of a 2-line structure so that the processors can be reset by supplying a detected signal from the power supply voltage monitor circuit to the other printed circuit board through one line of the connector. The processors can be reset by supplying the signal for resetting the other printed circuit board to the printed circuit board through the other line of the connector.

Second, the microprocessor accommodating the power supply voltage monitor circuit is an active low microprocessor which is reset by a (low) L level reset signal and is constituted to output the signal sent from the power supply voltage monitor circuit to the one line of the connector through the gate circuit for waveform shaping.

Third, the microprocessor cascade connected by the two lines is a low active microprocessor which is reset by the L level reset signal. The power supply voltage monitor circuit, gate circuit for waveform shaping and delay circuit are provided. The power supply voltage monitor circuit and the gate circuit for waveform shaping are connected to the signal line for receiving the signal through the gate circuit for waveform shaping, while the power supply voltage monitor circuit is connected to the processor through the delay circuit and is also connected to the processor in the preceding stage through the connector and the other line.

Fourth, the delay circuit is formed by a monostable circuit multivibrator.

Fifth, the delay circuit gives a delay time for compensating for the reset period of resetting processors in synchronization.

Other characteristics of the present invention are as follows, in the system formed by a plurality of processors.

First, the processor comprises a power supply voltage monitor circuit which detects power supply voltage of the processor and outputs the reset signal for resetting the processor, and the reset signals of a plurality of power supply voltage monitor circuits are cascade-connected. When the system power supply is turned on and the predetermined voltage is detected by the power supply voltage monitor circuit, only one power supply voltage monitor circuit is reset, and the reset signal is sequentially sent to the next power supply voltage monitor circuit with the reset signal of the one power supply voltage monitor circuit and the last power supply voltage monitor circuit resets all processors.

Second, a 2-line connector for connecting processors is provided between the printed circuit boards, and a detected signal from the power supply voltage monitor circuit is supplied to the other printed circuit board through the one line of the connector. This reset signal is supplied, through the other one line, to the processor in the printed circuit board mounting the power supply voltage monitor circuit in order to reset such processor.

Third, a slave printed circuit board mounting the power supply voltage monitor circuit and one processor is connected with the master printed circuit board mounting only one processor through a 2-line connector.

Fourth, the slave printed circuit board is provided with a low active microprocessor which is reset by the L level reset signal and an output of the power supply voltage monitor circuit is provided to only one line of connector through the gate circuit for waveform shaping.

Fifth, the master printed circuit board is provided with the low active microprocessor which is reset by the L level reset signal and with the power supply voltage monitor circuit, gate circuit for waveform shaping and delay circuit, the power supply voltage monitor circuit and gate circuit for waveform shaping which are connected to the signal line received from the slave side through the gate circuit for waveform shaping. The power supply voltage monitor circuit is connected to the processor through the delay circuit and also connected to the slave side processor through the connector and the other line.

Sixth, the delay circuit is formed by a monostable multivibrator; and

Seventh, the delay circuit gives a delay time to compensate for the reset period for synchronously resetting the master side processor and slave side processor.

DESCRIPTION OF THE PREFERRED EMBODIMENTS

The preferred embodiments of the present invention will be explained with reference to the accompanying drawings.

Figure 4:
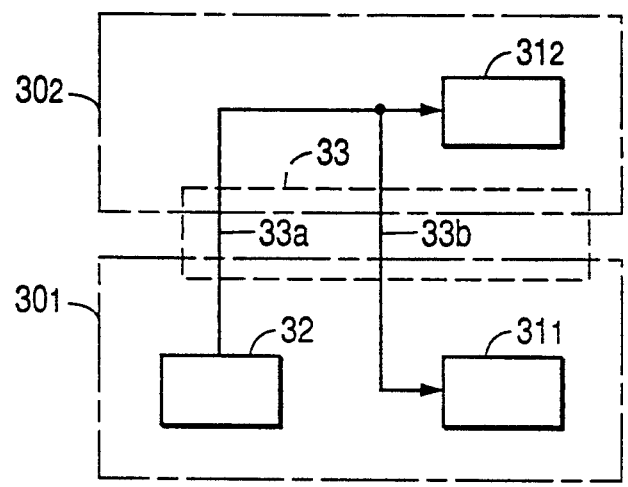
FIG. 4 is a diagram for explaining the first embodiment of the present invention.

FIG. 4 indicates the first embodiment of the present invention. The reference numerals $30_1$, $30_2$ circuit boards which respectively designate processors $31_1$, $31_2$. The numeral 32 designates a power supply voltage detecting circuit provided on the one printed circuit board $30_1$ and this circuit resets the processors $31_1$, $31_2$ by detecting change of voltage when the system power supply turns on.

The present invention is formed by connecting the processors $31_1$, $31_2$ with the connector 33 accommodating two lines $33a$, $33b$. The detected signal from the power supply voltage monitor circuit 32 is supplied to the other printed circuit board $30_2$ through the one line $33a$ of the connector 33 to reset the processor $31_2$. Moreover, this reset signal is supplied to the one printed circuit board $30_1$ through the other line $33b$ of the connector 33 to reset the processor $31_1$.

The detected signal from the power supply voltage monitor circuit 32 is supplied to the other printed circuit board $30_2$ through the one line $33a$ in order to reset the processor $31_2$. The reset signal from the power supply voltage monitor circuit 32 is supplied to the printed circuit board $30_1$ providing the power supply voltage monitor circuit 32 through the other line $33b$ of the connector 33 in order to reset the processor $31_1$.

Namely, the processors of respective printed circuit board are simultaneously reset with the detected signal input through the connector 33.

Therefore, the timing is never deviated for resetting each of the processors and thus, the processors may be reset simultaneously. Moreover, if the connector provides a poor connection, all processors are not reset and thereby the system cannot be operated.

Figure 5:
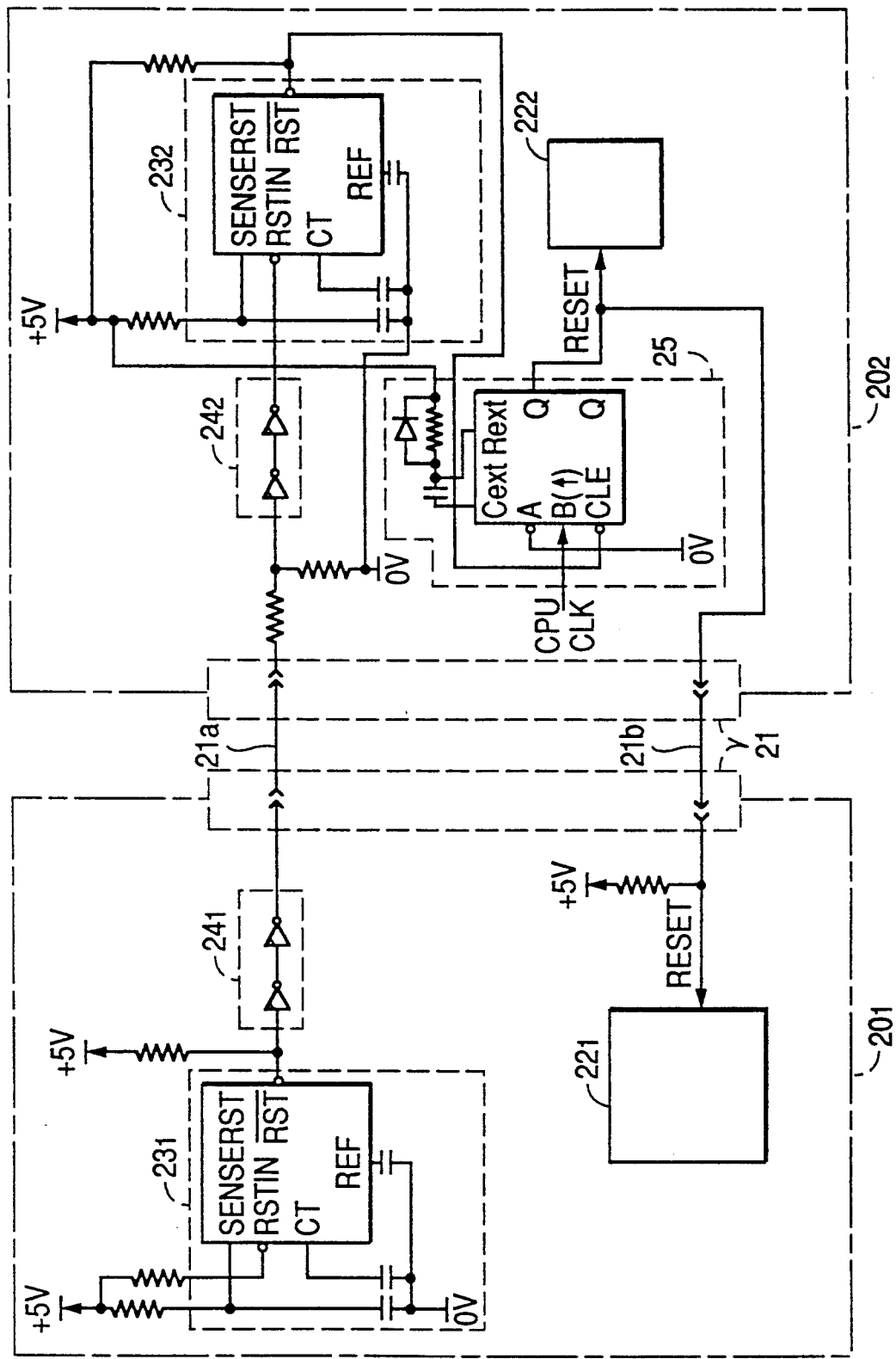
FIG. 5 is a diagram for explaining the second embodiment of the present invention.

FIG. 5 is a second embodiment of the present invention. In this figure, $20_1$ designates a slave printed circuit board and $20_2$, is a master printed circuit board. These are connected with a connector 21 comprised of two lines structure.

The slave printed circuit board is provided with the low active microprocessor $22_1$ which is reset by the L level reset signal, a power supply voltage monitor circuit $23_1$ and a gate circuit 24 for waveform shaping.

On the other hand, the master printed circuit board $20_2$ is provided with a low active microprocessor 22 which is reset by the L level reset signal, a power supply voltage monitor circuit $23_2$, a gate circuit $24_2$ for waveform shaping and a delay circuit 25 formed by monostable multivibrator.

The power supply voltage monitor circuit $23_1$ of the printed circuit board $20_1$ is connected to the gate circuit $24_2$ and the power supply voltage monitor circuit $23_2$ of the printed circuit board $20_2$ through the line $21a$ of connector 21. Moreover, the power supply voltage monitor circuit $23_2$ of the printed circuit board $20_2$ is connected to the processor $22_2$ through the delay circuit 25 and also connected to the processor $22_1$ of printed circuit board $20_1$ through the other line $21b$ of connector 21.

Next, operations of the second embodiment are explained.

If connector 21 is connected normally, when the power supply (+5V) of the slave printed circuit board $20_1$ is turned on, change of voltage when the power supply is turned on is detected by the power supply voltage monitor circuit $23_1$ and the detected signal is output from the terminal $\overline{RST}$ and its waveform is shaped by the gate circuit $24_1$. Thereafter, this signal is supplied to the master printed circuit board $20_2$ through the line $21a$ of connector 21.

The detected signal supplied to the printed circuit board $20_2$ is also waveform-shaped and is then supplied to the power supply voltage monitor circuit $23_2$. Change of voltage is detected therein and the detected signal is output from the terminal $\overline{RST}$.

The detected signal output from the power supply voltage monitor circuit 232 is formed as the reset signal of a predetermined pulse width by the delay circuit 25 formed by the monostable multivibrator. This signal is then supplied to the processor $22_2$ to reset the processor and is also supplied to the processor $22_1$ of the slave printed circuit board $20_1$ through the line $21b$ of connector 21 in order to reset each processor.

Here, the delay circuit 25 provides the reset signal of the predetermined pulse width in order to reset substantially synchronously the processors $22_1$ and $22_2$ together when the printed circuit board $20_1$ is provided comparatively far from the printed circuit board $20_2$, namely for the purpose of reset period compensation.

Figure 3:
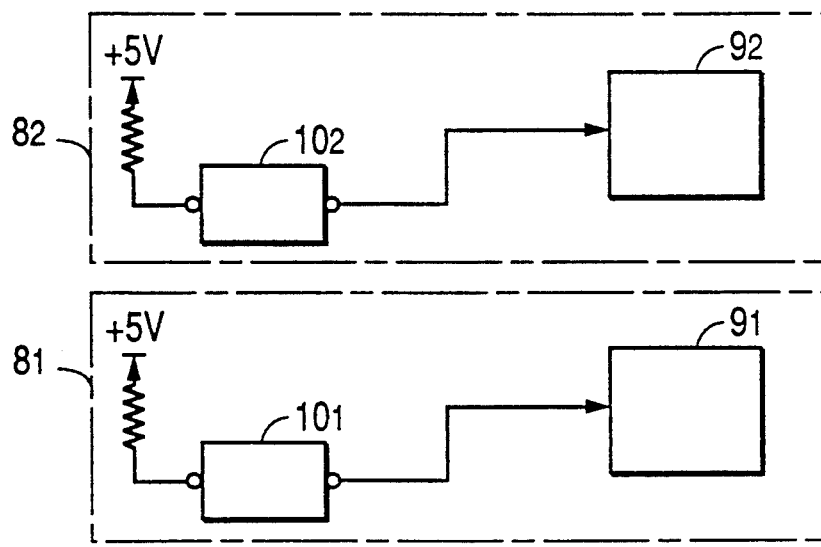

As explained previously, since the reset signal output from the delay circuit 25 is supplied in parallel to the processors $22_2$ and processor $22_1$, the processors can be reset reliably like the prior art of FIG. 3.

Meanwhile, if the connector 21 fails to provide defective connection, both lines $21a$ and $21b$ become OFF and thereby the detected signal is never supplied to the printed circuit board $20_2$ because the line $21a$ is OFF even when the power is turned on in the printed circuit board $20_1$.

Accordingly, when the connector provides defective connection, both processors $22_2$ and $22_1$ are never reset.

Figure 1:
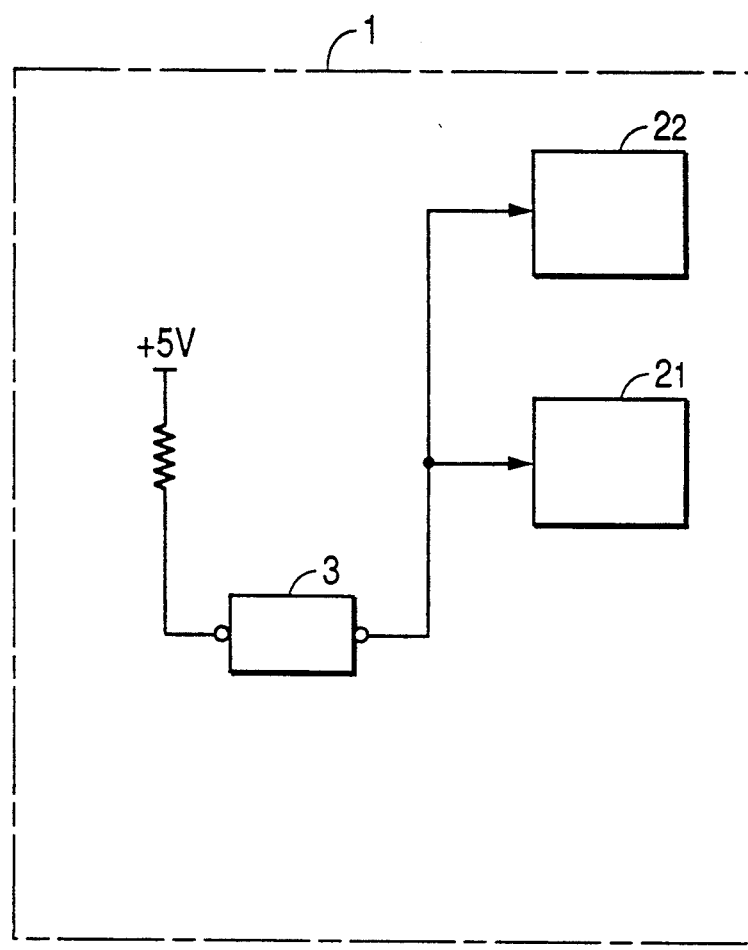
FIG. 1, FIG. 2 and FIG. 3 are diagrams for explaining the prior art.
Figure 2:
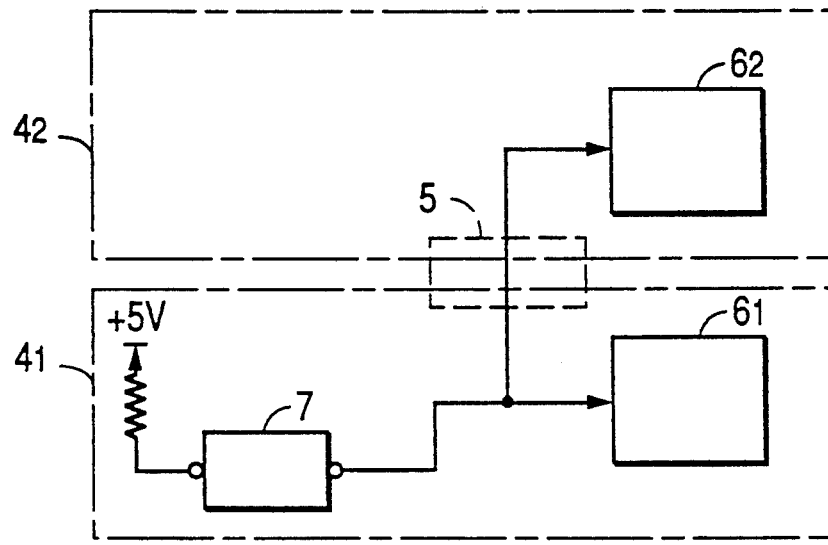

As a result, only one process is reset like the prior art of FIG. 2 and the system cannot operate.

FIG. 5 shows an example of a couple of systems, where the printed circuit board has a double-sheet structure. However the present invention is not limited thereto and may be formed in a structure where three printed circuit boards ($26_1$, $26_2$, $26_3$) are provided as shown in FIG. 6 or four sheets of printed circuit boards are used.

Figure 6:
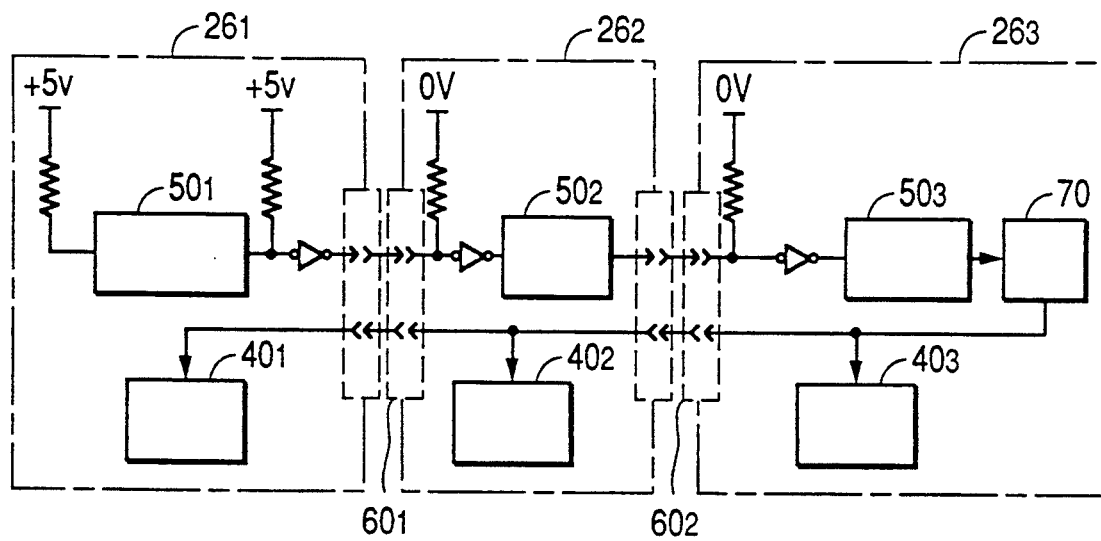
FIG. 6 is a diagram for explaining the third embodiment of the present invention.

In the structure of FIG. 6, the printed circuit board $26_1$ is provided with the power supply voltage monitor circuit $50_1$ and processor $40_1$.

The printed circuit board $26_2$ is provided with the power supply voltage monitor circuit $50_2$ and processor $40_2$. Meanwhile, the printed circuit board $26_3$ is provided with the power supply voltage monitor circuit $50_3$, processor $40_3$ and delay circuit $70_1$. The printed circuit boards $26_1$ and $26_2$ are connected with the connector $60_1$ and the printed circuit boards $26_2$, $26_3$ are connected with each other by the connector $60_2$.

Upon detection of power voltage by printed circuit board $26_2$, the power supply voltage monitor circuit $50_1$ sends the reset signal to the power supply voltage monitor circuit $50_2$ through the connector $60_1$.

The power supply voltage monitor circuit $50_2$ detects the power source voltage on of the printed circuit board $26_2$ and sends the reset signal, when it is input from the power supply voltage monitor circuit $50_1$, to the power supply voltage monitor circuit $50_3$.

The power supply voltage monitor circuit $50_3$ detects the power supply voltage of printed circuit board $26_3$ and sends the reset signal to delay circuit 70, when it is input from the power supply voltage monitor circuit $50_2$, to the processors $40_1$, $40_2$, $40_3$ of the printed circuit boards $26_1$, $26_2$, $26_3$ through connectors $60_2$ and $60_1$.

As explained previously, the present invention has a structure that the detected signal by power supply voltage is supplied in parallel to respective processors through the connectors without any deviation of timing. Accordingly, the respective processors may be simultaneously and reliably reset without any deviation of timing.

Moreover, if a connector provides a defective connection, the processors are never reset and the system is also never operated without control.

I claim:

1. A multiprocessor system with power-on reset, comprising:
   a plurality of printed circuit boards;
   a plurality of processors respectively provided on said plurality of printed circuit boards, each circuit board having a respective, individual processor thereon;
   power supply voltage monitor means, connectable to receive a power supply voltage, for detecting the power supply voltage and for producing a corresponding reset signal in response thereto;
   a first signal line connecting said power supply voltage monitor means and at least two of said printed circuit boards; and a reset signal line provided in parallel with the first signal line and connecting at least two of said printed circuit boards.

2. A multiprocessor system with power-on reset, comprising:
   a plurality of printed circuit boards, at least one of said printed circuit boards connectable to receive a system power source voltage;
   a plurality of processors, at least one processor provided on each of said printed circuit boards;
   a connector having two parallel lines to connect at least two of said printed circuit boards; and
   power supply voltage monitor means, provided on one of said printed circuit boards, for resetting said processors by supplying a reset signal to said printed circuit boards through one of said lines of said connector and for returning the reset signal to the one of said printed circuit boards through the other of said lines of said connector.

3. A multiprocessor system with power-on reset according to claim 2, wherein
   said processors include reset means for being reset by the reset signal, and wherein
   said power supply voltage monitor means includes means for sending a low level reset signal to the one of said lines of said connector.

4. A multiprocessor system with power-on reset according to claim 3, wherein the reset signal is a low level reset signal and said processors are reset by the low level reset signal; and wherein said multiprocessor system further comprises:
   gate means for waveform shaping the reset signal; and
   delay means for delaying the reset signal.

5. A multiprocessor system with power-on reset according to claim 4, wherein said delay means comprises a monostable multivibrator.

6. A multiprocessor system with power-on reset according to claim 4, wherein said delay means includes means for delaying the reset signal by a delay time to synchronously reset all of said processors.

7. A multiprocessor system with power-on reset, comprising:
   a plurality of printed circuit boards;
   a plurality of processors, at least one processor provided on each of said printed circuit boards;
   a reset signal line connecting at least two of said printed circuit boards;
   first power supply voltage monitor means, provided on one of said printed circuit boards, for detecting a power supply voltage and for providing a first reset signal responsive to the detecting; and
   second power supply voltage monitor means, provided on another of said printed circuit boards, for receiving the first reset signal and for providing a second reset signal over said reset signal line to reset said processors, the second reset signal provided responsive to receiving the first reset signal.

8. A multiprocessor system with power-on reset according to claim 7,
   further comprising a connector having first and second lines operatively connecting said printed circuit boards, and
   wherein the second reset signal from said second power supply voltage monitor means is supplied to said printed circuit boards through the first line of said connector and the first reset signal is supplied to the at least one processor in the one of said printed circuit boards through the second line of said connector to reset the at least one processor therein.

9. A multiprocessor system with power-on reset according to claim 8, wherein the one of said printed circuit boards is connected to the other of said printed circuit boards through said connector.

10. A multiprocessor system with power-on reset according to claim 9,
    wherein the at least one processor provided on the other of said printed circuit boards is reset by a low level of the second reset signal, and
    wherein said second power supply voltage monitor means includes means for providing an output to the first line of said connector.

11. A multiprocessor system with power-on reset according to claim 10,
    further comprising gate means for gating a signal and delay means for delaying a signal, and
    wherein said first power supply voltage monitor means and said gate means are operatively connected to the first line of said connector received through said gate means and operatively connected to a second of said printed circuit boards, and
    wherein said first power supply voltage monitor means is operatively connected to the at least one processor of the second of said printed circuit boards through said delay means and is operatively connected to the at least one processor of the one of said printed circuit boards through the second line of said connector.

12. A multiprocessor system with power-on reset according to claim 10, wherein said delay means comprises a monostable multivibrator.

13. A multiprocessor system with power-on reset according to claim 12, wherein said delay means includes means for generating the second reset signal and for delaying the first reset signal by a delay time to synchronously reset said processors.

14. A multiprocessor system with power-on reset, comprising:
    a plurality of printed circuit boards;
    a plurality of processors, at least one processor provided on each of said printed circuit boards;
    first power supply voltage means, connectable to receive a power supply voltage and provided on one of said printed circuit boards, for providing a reset signal by detecting the power supply voltage;
    a first signal line connecting said first power supply voltage means to at least one of said processors located on all other of said printed circuit boards; and
    a second signal line provided in parallel with the first signal line and connecting said processors located on the all other of said printed circuit boards to the at least one processor provided on the one of said printed circuit boards.

15. A multiprocessor system according to claim 14, comprising:
    gate means for waveform shaping the reset signal and for providing a first signal based on the waveform shaping; and
    delay means for providing a second reset signal responsive to delaying the first signal to reset said processors simultaneously.

16. A multiprocessor system according to claim 15, wherein said delay means comprises a monostable multivibrator.

17. A multiprocessor system according to claim 14, further comprising:

second power supply voltage means, provided on one of the all other of said printed circuit boards, for providing a second reset signal to reset said processors responsive to receiving the reset signal.

18. A multiprocessor system with power on reset, comprising:

a master printed circuit board, including:
  master power supply monitoring means for detecting a power supply voltage, for receiving a first reset signal and for providing a second reset signal responsive to receipt of the first reset signal and detection of the power supply voltage,
  delay means for delaying the second reset signal and for providing a third reset signal responsive to the second reset signal after the delaying, and
  a master processor operatively connected to said delay means;
a slave printed circuit board, including:
  slave power supply monitoring means for detecting the power supply voltage and for providing the first reset signal responsive to detection of the power supply voltage,
  a slave processor operatively connected to said delay means, the third reset signal resetting said master processor and said slave processor simultaneously.

19. A multiprocessor system according to claim 18, wherein said slave printed circuit board further includes gate means for waveform shaping the first reset signal.

20. A multiprocessor system according to claim 18, wherein said master printed circuit board of further includes gate means for waveform shaping the first reset signal.

* * * * *

UNITED STATES PATENT AND TRADEMARK OFFICE
CERTIFICATE OF CORRECTION

PATENT NO. : 5,297,261
DATED : March 22, 1994
INVENTOR(S) : Kuranaga

It is certified that error appears in the above-indentified patent and that said Letters Patent is hereby corrected as shown below:

Col. 1, line 18, delete "the";
      line 19, "an" should be --units--.
Col. 2, line 3, "here" should be --there--.
Col. 3, line 3, "The" should be --Other--;
      line 38, "circuit multivibrator" should be --multivibrator circuit--.
Col. 4, line 43, "the" (first occurrence) should be --a--;
      line 44, after "$30_2$" insert --indicate printed--.
Col. 5, line 11, after "$20_2$" delete ",";
      line 12, after "of" insert --a--;
      line 39, after "on," insert --the--;
      line 52, "232" should be --$23_2$--.

Signed and Sealed this

Thirtieth Day of May, 1995

Attest:

BRUCE LEHMAN

Attesting Officer     Commissioner of Patents and Trademarks